Sept. 19, 1939. W. T. GOLLWITZER Re. 21,207

SELECTIVE PRINTING MACHINE

Original Filed May 8, 1935 9 Sheets-Sheet 1

INVENTOR.
Walter T. Gollwitzer,
BY
Bair, Golnick & Teas
ATTORNEYS.

SELECTIVE PRINTING MACHINE

Original Filed May 8, 1935 9 Sheets-Sheet 2

INVENTOR.
Walter T. Gollwitzer,
BY
Bates, Golrick & Teare,
ATTORNEYS.

Sept. 19, 1939. W. T. GOLLWITZER Re. 21,207

SELECTIVE PRINTING MACHINE

Original Filed May 8, 1935 9 Sheets-Sheet 3

INVENTOR.

Walter T. Gollwitzer

Bates, Golrick & Fearo

ATTORNEYS.

Sept. 19, 1939. W. T. GOLLWITZER Re. 21,207

SELECTIVE PRINTING MACHINE

Original Filed May 8, 1935 9 Sheets-Sheet 4

INVENTOR.

BY Walter T. Gollwitzer

Dales, Golrick & Tear

ATTORNEYS.

SELECTIVE PRINTING MACHINE

Original Filed May 8, 1935 9 Sheets-Sheet 5

INVENTOR.
Walter T. Gollwitzer,
BY
Bates Gobrick & Fears
ATTORNEYS.

SELECTIVE PRINTING MACHINE

Original Filed May 8, 1935 9 Sheets-Sheet 6

INVENTOR.
Walter T. Gollwitzer
BY
Bates, Golcher & Fears
ATTORNEYS.

SELECTIVE PRINTING MACHINE
Original Filed May 8, 1935 9 Sheets-Sheet 7
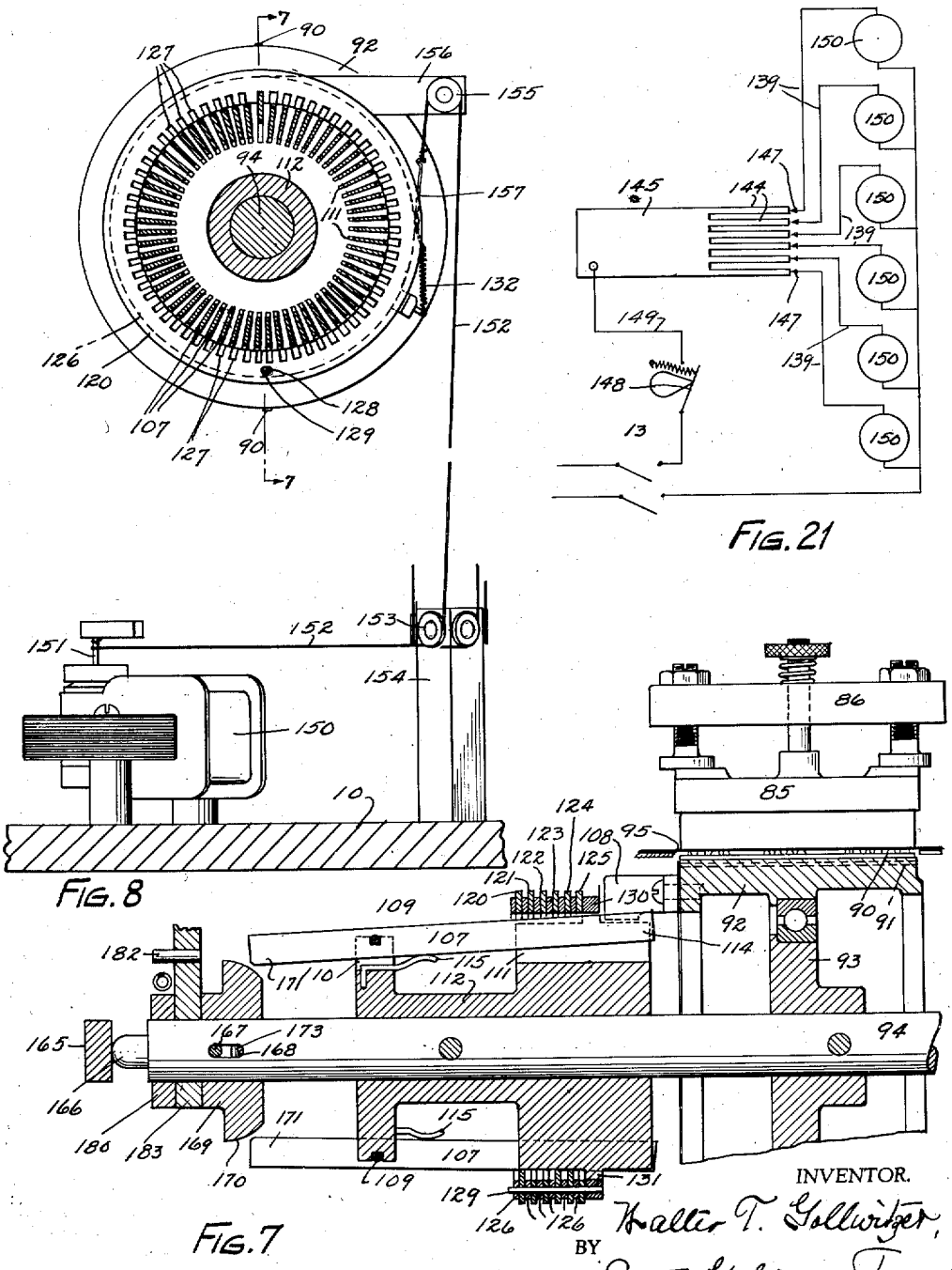
INVENTOR.
Walter T. Gollwitzer,
BY
Bates, Golrick & Teare,
ATTORNEYS.

INVENTOR.
Walter T. Gollwitzer.
BY
Bates, Golrick & Teare
ATTORNEYS.

Sept. 19, 1939. W. T. GOLLWITZER Re. 21,207

SELECTIVE PRINTING MACHINE

Original Filed May 8, 1935 9 Sheets-Sheet 9

INVENTOR.
Walter T. Gollwitzer,
BY
Bates, Golrick & Teare,
ATTORNEYS.

Reissued Sept. 19, 1939

Re. 21,207

UNITED STATES PATENT OFFICE 21,207

SELECTIVE PRINTING MACHINE

Walter T. Gollwitzer, Euclid, Ohio, assignor, by msene assignments, to Addressograph-Multigraph Corporation, Cleveland, Ohio, a corporation of Delaware Original No. 2,132,410, dated October 11, 1938, Serial No. 20,415, May 8, 1935. Renewed July 6, 1938. Application for reissue May 6, 1939, Serial No. 272,280

51 Claims. (Cl. 101—58)

Figure 1:
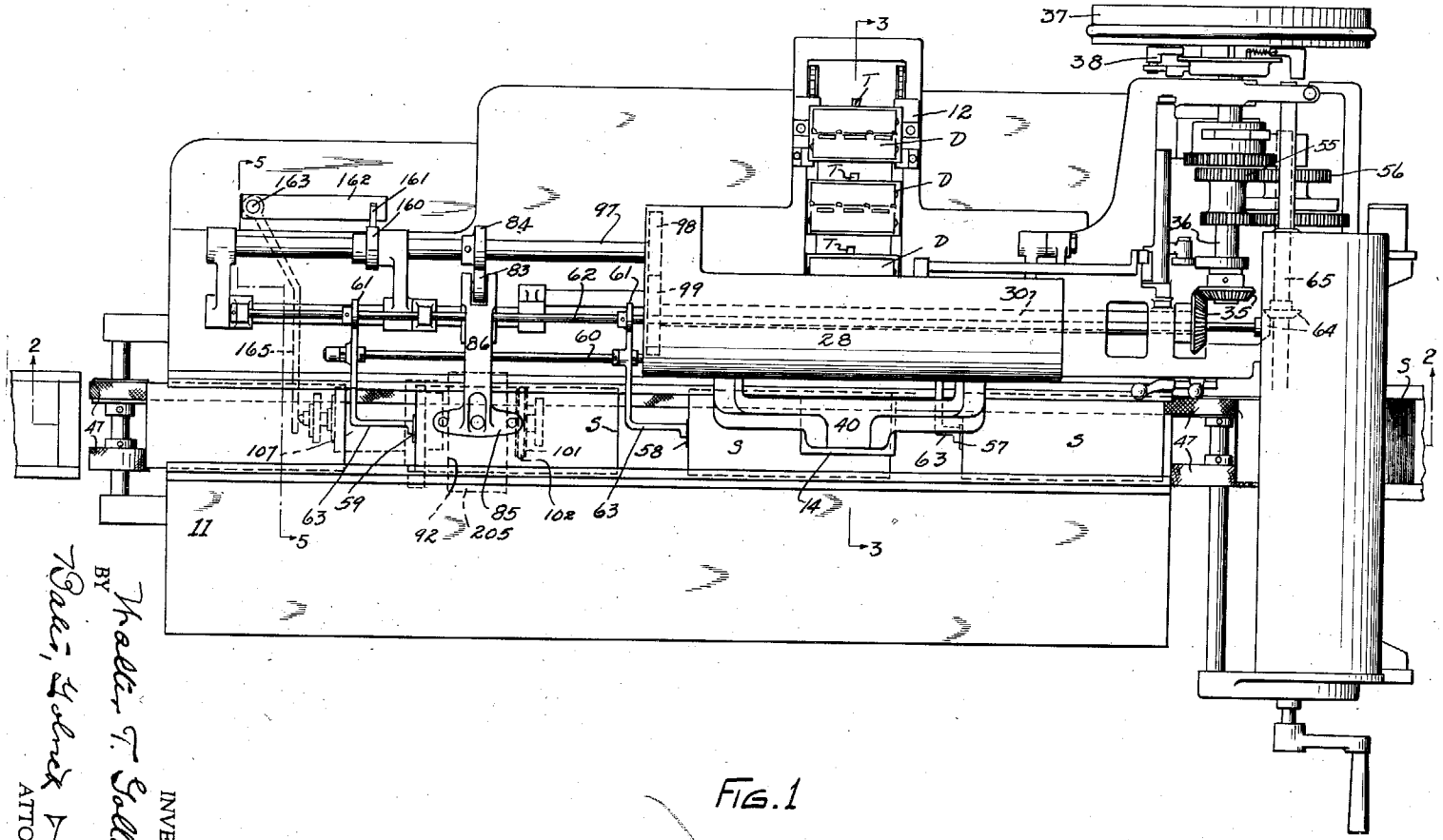

This invention relates to a series printing mechanism, and especially to one in which data is consecutively printed from a series of printing devices, and other data is selectively printed in association with the imprint made from each printing device, such other data being selectively controlled by the respective printing devices.

The general object of the present invention is to provide a printing mechanism, having a series of individual printing devices adapted to be successively impressed upon a work sheet or upon successive work sheets, with a supplemental printing mechanism adapted thereafter to selectively print on such work sheet or sheets from any one of a plurality of printing members, the selection of the printing member used being dependent upon or controlled by the individual printing devices.

A more specific object is the provision of a mechanism whereby a comparatively small number of control positions, or selector units, carried by an address or similar printing device, may select any one of a much greater number of supplemental printing members, to cause the impression of such selected printing member to be made in a predetermined registration relative to the impression made from the printing device carrying the control member or members.

The invention is adapted for use in printing various articles and lists, an instance of which is the printing of dividend checks and the like. In such cases it is desirable that each check be impressed with the payee's or stockholder's name and the amount of payment in money values. While all this data might be mounted on one printing device, that would require the frequent change of that portion of the device setting out the value, because the amount of stock held by any individual is liable to change between successive dividend periods and also the dividend rate is liable to change. The present invention is utilizable in printing dividend checks without the necessity of making any alteration of the printing devices for changes in the dividend rate, while it simplifies the alteration of the printing devices due to a change in the number of shares.

By my invention, the number of shares which each party owns may be represented by an index removably carried by the printing device and readily changeable from time to time, and the change in amount, due to the alteration of the dividend rate, may be effected by simply changing the printing members of the supplemental printing device.

As a change in the dividend rate affects all of the stockholders, while a change in the number of shares applies only to the comparatively small number of individuals whose holdings have changed since the last dividend period, and as a great many stockholders own the same number of shares, it follows that there is a much less total change required by my system, where the only alteration on the printing device is for a change in the number of shares held, and where the only alteration in the supplemental printer is for a change in amount, due to a change in dividend rate.

By way of example, suppose the total number of stockholders is six thousand. It frequently happens that the different number of shares owned by these stockholders may not exceed sixty. Therefore, it is much simpler by my system, which contemplates changing only the sixty supplemental printing members representing the sixty different numbers of shares owned, than by a system which would require changing each of the six thousand printing devices. The controlling index on the printing device, which corresponds to the number of shares held by that individual, obviously need only be changed when the number of shares held changes, which, by way of example, might be only twenty for six thousand shares.

Accordingly, it may be stated as one of the objects of my invention to provide a mechanism which may be selectively controlled by indicia removably carried by the printing devices and operative to print by the use of any of a number of printing members which are arranged in a series in said mechanism and readily changed therein.

Other objects of the present invention will become more apparent from the following description, reference being had to the accompanying drawings, which illustrate one form of the invention. The essential features of the invention will be summarized in the claims.

Figure 2:
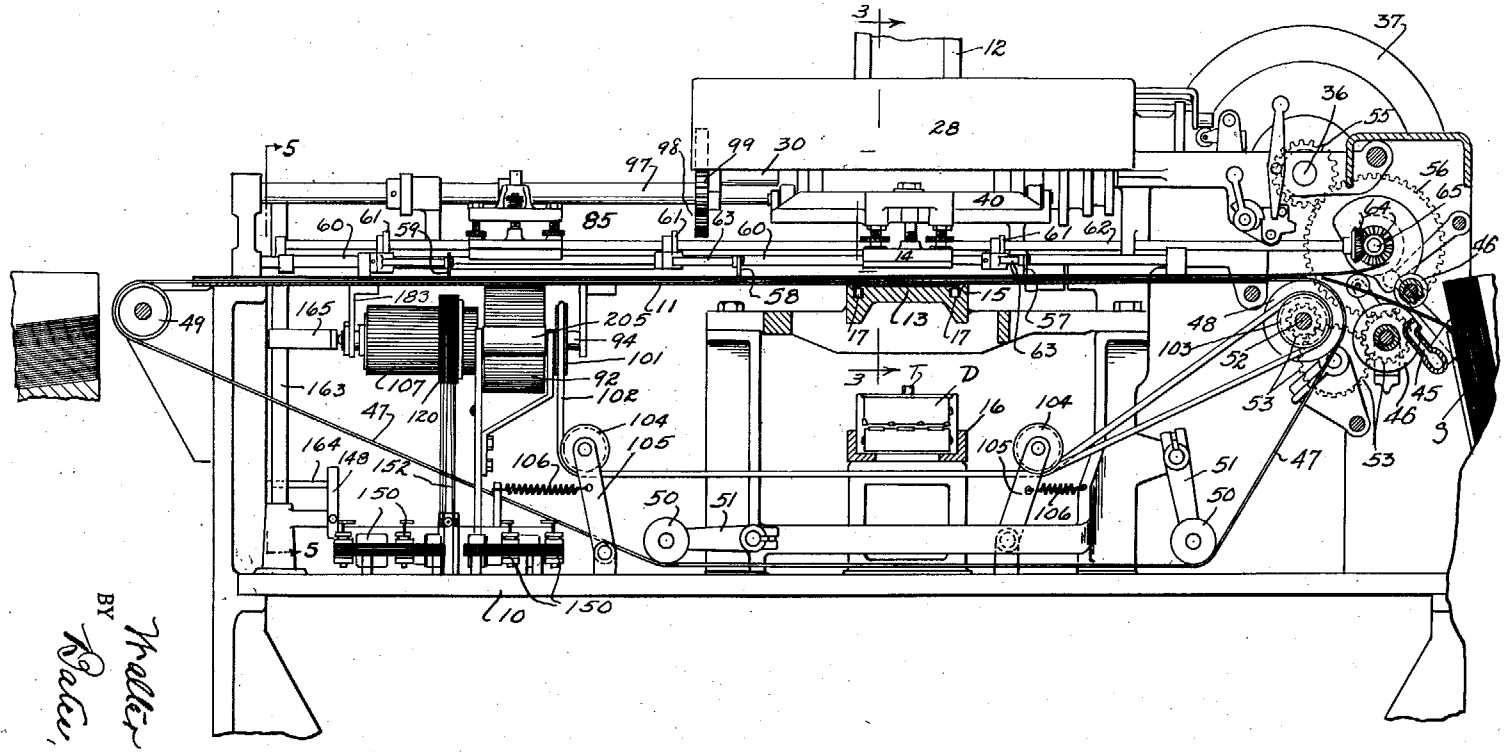
Figure 3:
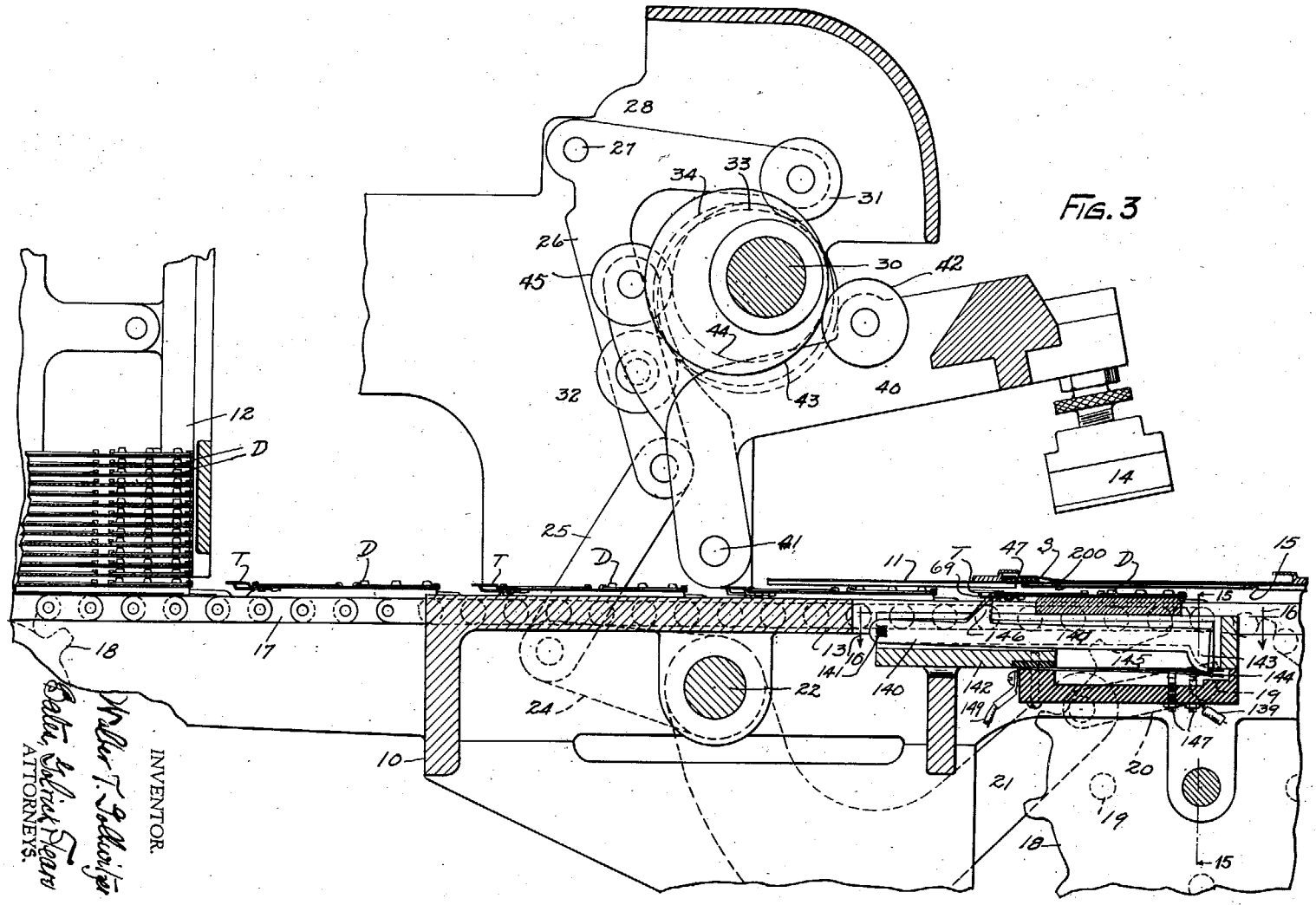
Figure 4:
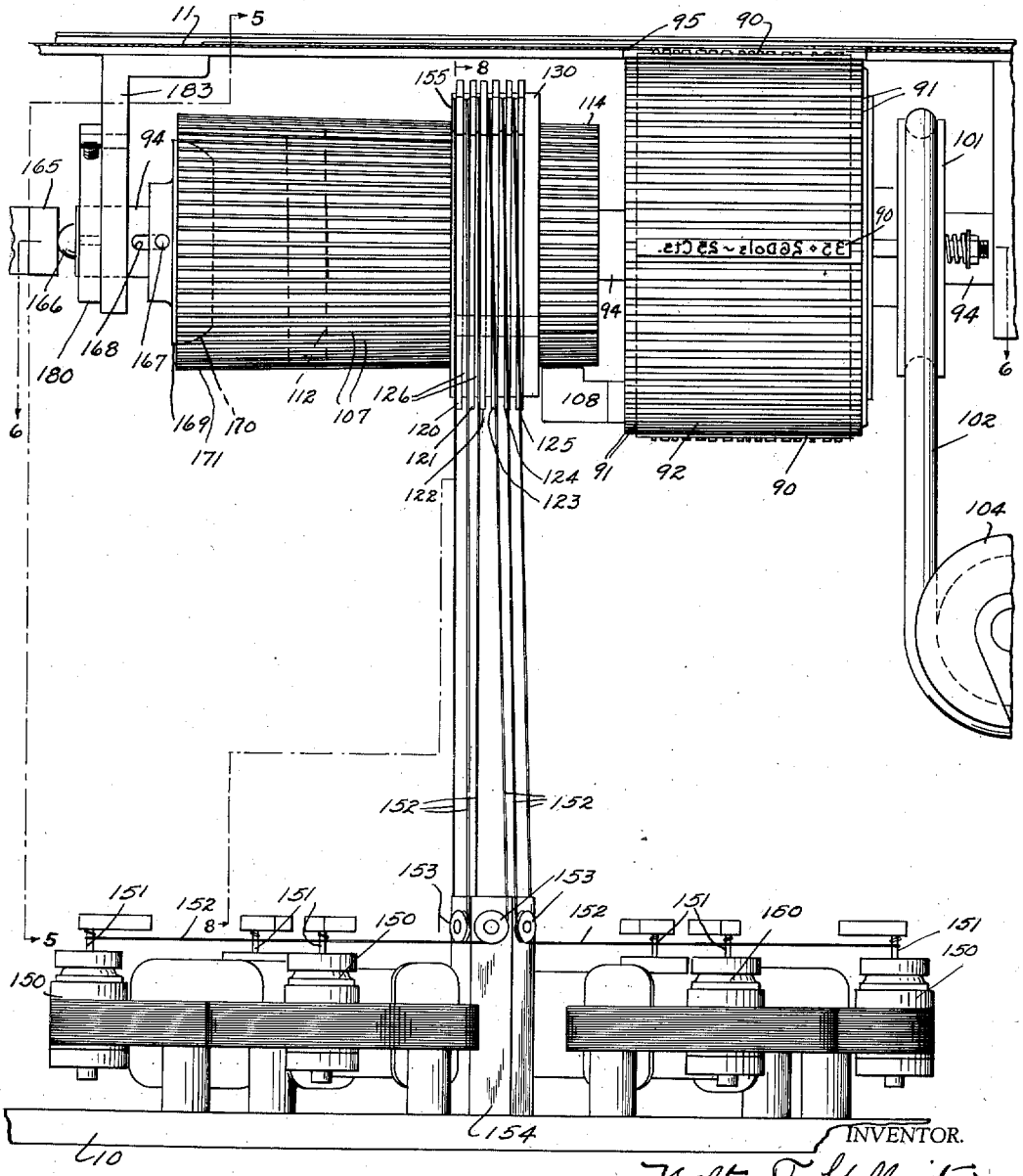
Figure 5:
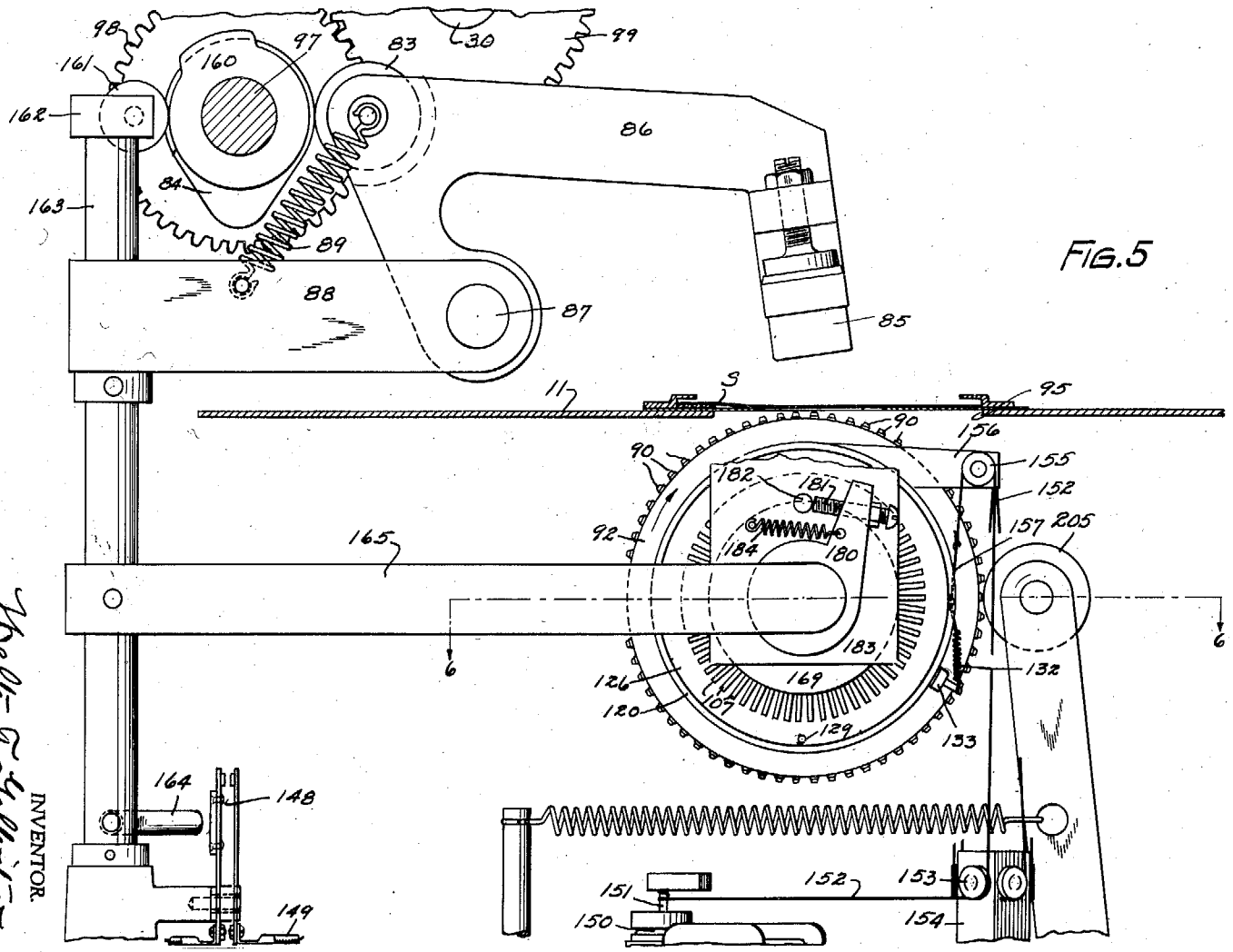
Figure 6:
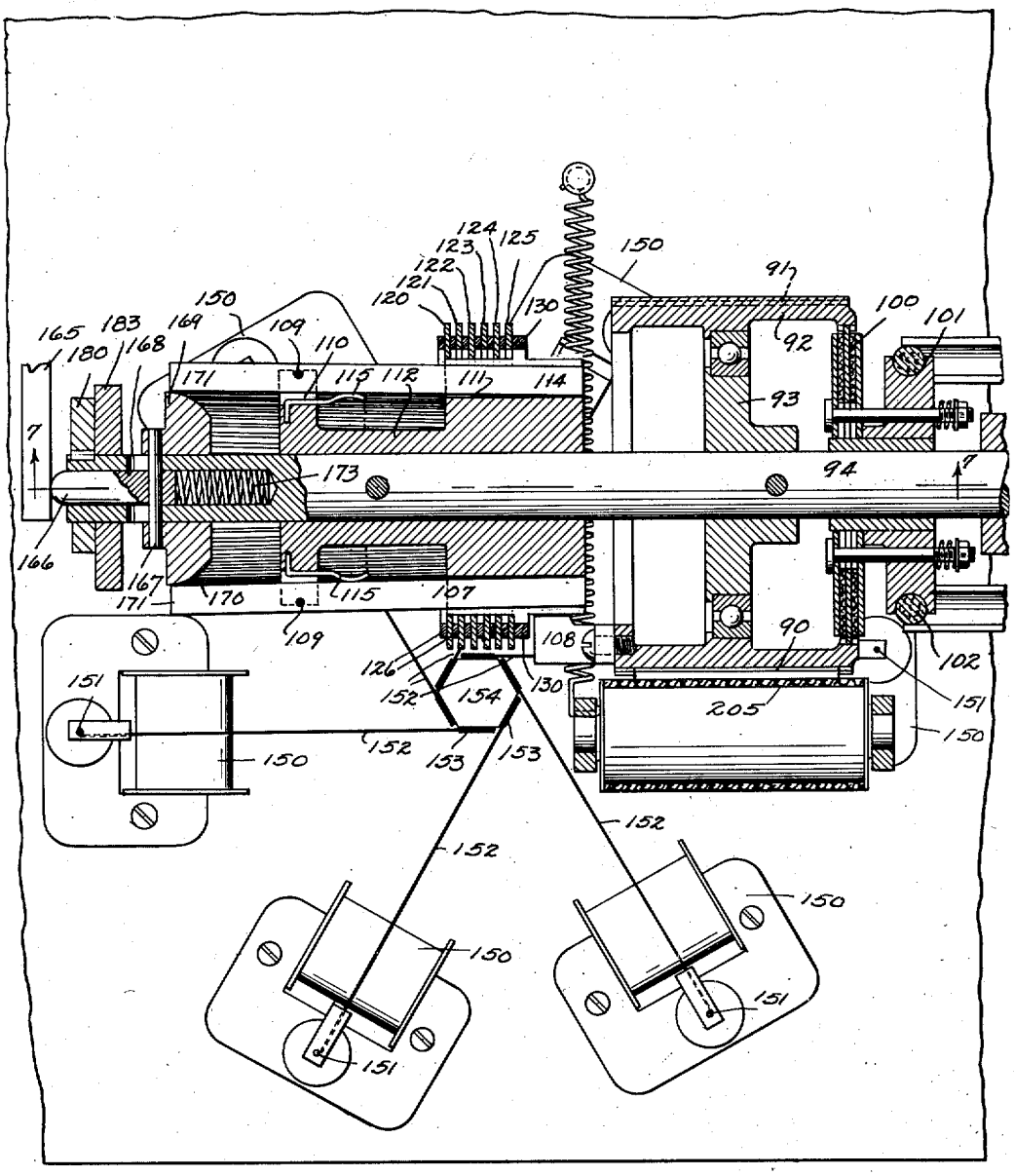
Figure 9:
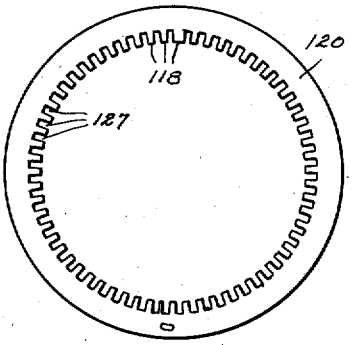
Figure 10:
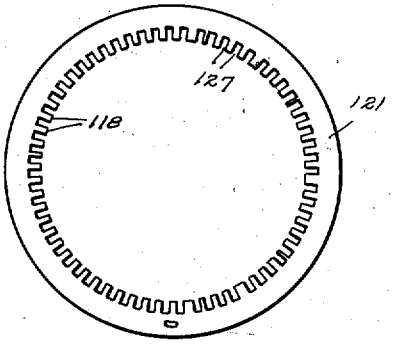
Figure 11:
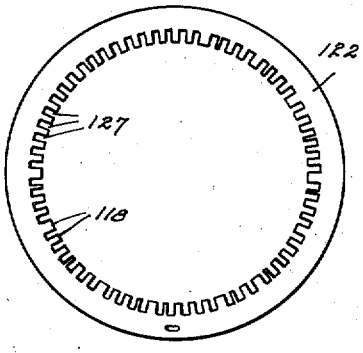
Figure 12:
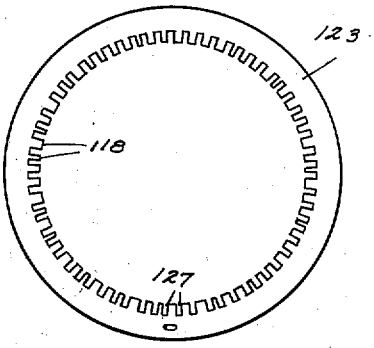
Figure 13:
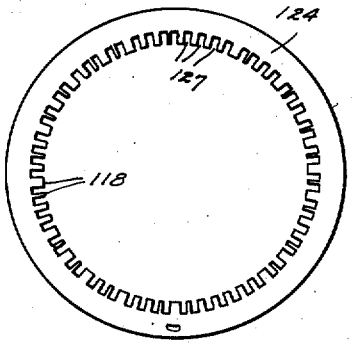
Figure 14:
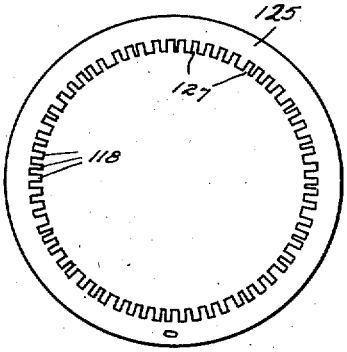

In the drawings, Fig. 1 is a plan view of a mechanism embodying my invention; Fig. 2 is a front elevation of the mechanism illustrated in Fig. 1; Fig. 3 is a transverse section through the printing mechanism and printing device feed, the plane of the section being indicated by lines 3—3 on Figs. 1 and 2; Fig. 4 is a fragmentary front elevation illustrating the supplemental printing member unit on an enlarged scale; Fig. 5 is a transverse section indicated by lines 5—5 on Figs. 1, 2 and 4; Fig. 6 is a horizontal section, as indicated by lines 6—6 on Figs. 4 and 5; Fig. 7 is a fragmentary vertical section as indicated by lines 7—7 of Fig. 6; Fig. 8 is a vertical section, as indicated by lines 8—8 on Figs. 4 and 6; Figs.

Figure 15:
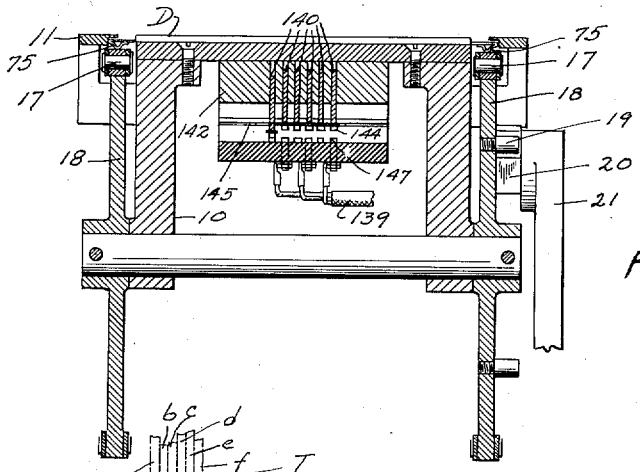
Figure 17:
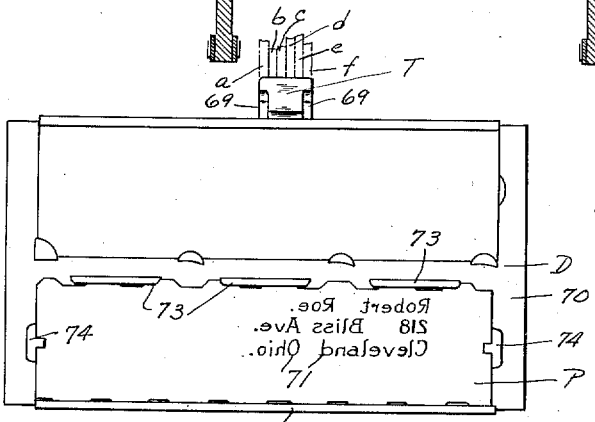
Figure 18:
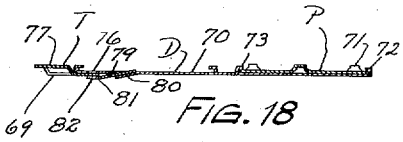
Figure 19:
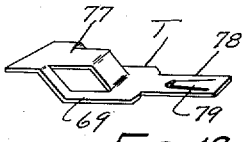
Figure 16:
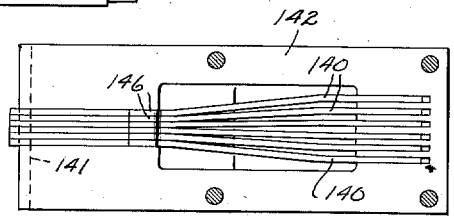
Figure 20:
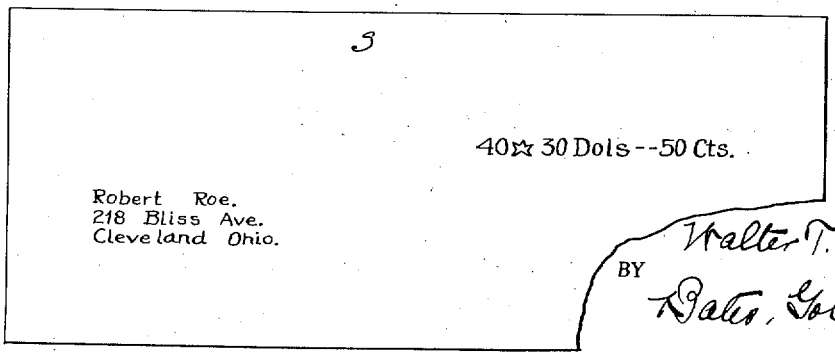

9 to 14, inclusive, are details of certain permutation members used to control the supplemental printer; Figs. 15 and 16 are sectional details, substantially as indicated by the correspondingly numbered lines on Fig. 3; Fig. 17 is a plan view of a printing device; Fig. 18 is a sectional view of the printing device, as indicated by the lines 19—19 on Fig. 18; Fig. 19 is a perspective view of a selector member or tab; Fig. 20 is a view illustrating a work sheet printed by the use of my invention; Fig. 21 is an electrical wiring diagram illustrating the various electrical circuits.

The invention illustrated by the above mentioned drawings will be explained in connection with the printing of stock dividend checks. However, it is to be understood that the invention is capable of various other applications. I prefer to accomplish the invention by utilizing an address printing machine of the type generally known as the "Addressograph" machine. In this machine a series of individual printing plates, each bearing a name and address, are fed one at a time from a magazine into printing position and an impression is made from each plate on successive sheets fed to and from printing position by an automatic feeding device. The printing devices are provided with tabs which are adjustably positioned on the device.

My invention contemplates the provision of a series of supplemental printing members, any selected one of which may be used to print, in dollars and cents on the check, the amount to be paid to the stockholder whose name was impressed thereon from the address printing device. I utilize the tabs carried by each address device to indicate the number of shares owned by the shareholder whose name is impressed by such device. Each supplemental printing member may include a series of manually changeable type, while the entire series of such members are preferably carried by a common carrier and arranged to be selectively brought into printing position under the control of the tab.

The supplemental printing members are positioned under the control of the tab or tabs, carried by the address printing devices, in such a manner that a comparatively small number of tab selection positions may control a comparatively great number of printing members. I find this is advantageously accomplished by using a set of permutation members, each of which are controlled by the use of a tab selector position or area, but any and all of which are independently controlled so that one or a number of permutation members may act at once. Each combination of permutation members being effective to cause one specific supplemental printing member to be brought into printing position.

Suitable printing mechanisms, such as platens, are provided to coact with the printing devices and the printing members to automatically cause an impression to be made from each printing device and subsequently to cause an impression to be made from a selected printing member in registration with the impression of the printing device which controlled the selection.

The machine shown in the drawings has a suitable frame 10, which supports a flat horizontal table member 11, in its top portion and along which the sheets S move through printing position. Individual printing devices D, which contain several lines of printing characters, are stacked in the magazine 12 at the rear of the frame. The printing devices are successively taken from the bottom of the stack and moved along a guideway 13 to printing position beneath the platen 14 which operates to press the sheet upon the printing devices. The guideway 13 for the printing devices extends just beneath the table 11 and a suitable opening 15 is provided in the table which exposes the printing devices to the sheet when in printing position. The printing device guideway 13 extends forward to direct the printing device to the discharge chute 16 (Fig. 2).

Any suitable or well-known mechanism may be used for feeding the devices to printing position and holding them in printing position while the desired number of impressions are made therefrom and removing them from printing position.

As illustrated in Fig. 3, the printing devices are moved from the magazine 12 by chains 17 arranged on opposite sides of the printing device guideway and looped about sprocket members 18, which are rotatably carried by suitable shafts journalled in the frame. The forward one of these sprockets 18 is provided as shown in Fig. 3 with a series of pins 19 which are successively engageable by a pawl 20 pivotally mounted on a rocker 21 drivingly carried by a shaft 22 mounted in the bed of the machine. The shaft 22 is oscillated from a power shaft 30. As shown in Fig. 3, a suitable lever 24 rigidly carried by the shaft is connected, by a link 25, with a rock arm 26 pivotally mounted as at 27 to an upstanding frame bracket 28. The rock arm 26 is provided with a pair of rollers 31 and 32, arranged to be engaged by respective cams 33 and 34, drivingly carried by the power shaft 30.

The stamper or platen arm 40, which carries the platen 14, is pivotally mounted in the frame as at 41, and is alternately lowered and raised, into and out of contact with the printing device D, which rests in printing position, by a pair of cams 43 and 44 which engage rollers 42 and 45, respectively, carried by the platen arm 40. The cams 43 and 44 are rigidly mounted on the shaft 30, which is connected by bevelled gears 35 (Fig. 1) to a main drive shaft 36 of the machine. The main shaft carries a pulley 37 which is driven from a suitable source of power, and a suitable clutch 38 is provided for starting and stopping the mechanism.

The sheets S, which are to be printed, are contained in an angularly disposed stack at the right-hand side of the machine, Fig. 2, from which they are taken, one at a time, by a feeder bar 45 and inserted between the rolls 46.

The feed rolls 46 feed sheets onto the carriers 47, which travel along the top of the table 11. These belts are endless and travel around pulleys 48, 49 and 50. The pulleys 48 and 49 are mounted just beneath the machine table and the pulleys 50 are positioned some distance below the machine table and are mounted on adjustable arms 51, by means of which proper tension may be applied to the belts. The belt pulleys 48 are mounted on a shaft 52 which is driven by a train of gears 53. The gears 53 and the sheet feed rolls are driven in proper timed relation and at the proper speed from the main shaft 36 by means of trains of gears 55 and 56, Figs. 1 and 2. The foregoing arrangement for removing sheets from the stack positioning them on carriers or belts 47 is described in the patent to Joseph S. Duncan, 1,488,667, issued April 1st, 1924, to my assignee.

A series of stop fingers 57, 58 and 59, Figs. 1 and 2, are positioned above the path of the sheets along the table and are adapted, when projected into the path of a sheet to engage the end of the sheet and hold the sheet stationary while the platen arm operates to print an impression upon the portion of the sheet which is held by the fingers in printing position. The stop fingers are carried at the ends of arm 63 which are mounted on a shaft 60, and are swung vertically into and out of the path of movement of the sheets. The shafts 60 are supported by suitable brackets from the frame of the machine.

The stop fingers are operated by a series of cams 61, which are carried on a cam shaft 62. The cams are provided with suitable cam surfaces which are engaged by the ends of the stop finger arms 63. The stop fingers are operated in a definite timed relation to the operation of the platen arm and the plate feed, so that after the printing impression is made on the portion of the sheet in printing position, the stop fingers are raised to release the sheet and permit the belts 47 to advance the sheet and bring the next sheet in printing position. The cam shaft 62 is driven by bevelled gears 54 from a shaft 65, this shaft being connected to and driven at the proper rate of speed by the gear trains 55 and 56.

A printing device, for which the mechanism shown in the drawings is especially adapted, is best illustrated in Figs. 17 and 18. The printing device comprises a holder 70, and is arranged to removably carry a printing plate P having embossed thereon suitable printing characters 71. The lowermost edge of the holder is bent upwardly and inwardly, forming a lip 72, and a series of lips 73 are struck up from the body of the holder, beneath which lips the printing plate may be slid to position it on or remove it from the holder. The printing plate is prevented from endwise movement by suitable depressible abutments 74, which are preferably formed from the body of the holder. The sides of the holder are bent downwardly, forming, upon the back of the holder, spaced ribs 75, which serve to space the holders so that when they are stacked flat, one on top of another, the bottom of one holder will not contact with the embossed characters of the plate carried by the holder next below.

Located adjacent the upper edge of the holder are a series of pockets or keepers 76, adapted to support and retain in position one or more index tabs so that the body of the tab projects outwardly from the edge of the holder. Each index tab T is preferably removably retained in any of the keepers in the holder. Fig. 19 shows an index tab which is admirably adapted for use in connection with the printing device illustrated. Such tab comprises three main portions, namely, a wide, flat portion 77, a narrower portion 78, adapted to engage the sides of the pockets in the holder, and a tongue 79 to aid in locking the tab in the pockets. The arrangement of the holder is such that when the tab is inserted in a holder, the tongue 79 of the tab is depressed, due to an inclined area 80 of the pocket, causing the keeper to abut a surface 81 of a strap 82 formed in the holder.

The mechanism heretofore described utilizes the printing devices D to print the shareholder's name and address on the body of each check or sheet. After the check is so printed, the stop fingers 57 and 58 rise to permit the impressed sheet to advance and to permit the belts 47 to bring a new sheet into printing registration to be impressed with the shareholder's name and address carried by the next succeeding printing device. The sheets or checks, as they leave the initial printing position, advance towards the left (Figs. 1 and 2) into position beneath a supplemental platen 85, which is arranged to coact with any one of a number of suitable printing members, to impress on the printed sheet the amount in dollars and cents, together with the quantity of shares owned by the stockholder whose name is on such sheet.

The supplemental printing members are best illustrated in Figs. 4 to 8, inclusive. As shown, they may comprise type or type bars 90, which are set in line formation in axially extending grooves 91, formed in the periphery of a cylinder or drum 92, rotatably journalled on a disc 93 carried by a longitudinally extending shaft 94, rotatably mounted in the machine frame beneath the table 11, normally constrained against rotation as will be hereinafter described. The arrangement is such that the line of type or printing member 90 which is uppermost in the drum, is just below the top of the table. The table is provided with an opening 95, to permit the supplemental platen 85 to press the printed sheet into contact with such supplemental printing member. Each printing member 90 is supplied with printing characters, representing a definite number of shares and the sum of dollars and cents of the dividend to be paid thereon.

The supplemental platen 80 is carried by a platen arm 86, which is pivotally mounted as at 87 to a suitable frame bracket member 88. The platen arm 86 is provided with a roller 83 arranged to coact and normally held in contact with a cam 84, by a suitable spring 89, interposed between the platen arm and the frame bracket 88. The cam 84 is rigidly mounted on a shaft 97, journalled in the machine frame, and which is driven through a pair of gears 98 and 99 secured to the shafts 97 and the main platen drive shaft 30, respectively. The arrangement is such that the platen 85 is operated in timed relationship with the operation of the main platen 14, and the paper feed stop fingers 57, 58 and 59.

As heretofore mentioned, I have found that with several thousand shareholders the different number of shares owned by such shareholders may not exceed sixty. Hence, I find it advantageous to use sixty-three different printing members. As shown, such printing members 90 are spaced equi-distant from each other about the periphery of the drum 92, and any one may be brought into position to register with the platen 85. The drum 92 which carries the supplemental printing members 90 is normally constantly driven. As shown in Figs. 2, 5 and 6, the drum 92 is connected by a friction clutch 100, with a pulley 101, which is rotatably journalled on the shaft 94, heretofore described. The pulley 101 is constantly driven by an endless belt 102, which is looped around the pulley 101, a similar pulley 103 which is rigidly secured to the paper feed shaft 52, heretofore described. Suitable idler pulleys 104 cooperate with the belt 101 to maintain it taut. As shown, the pulleys 104 are carried by pivoted arms 105, and are maintained in contact with the belt 101 by suitable springs 106.

Shortly before the platen 85 is brought into contact with one of the printing members 90, one of a plurality of stop members 107 is brought into engagement with an abutment 108 rigidly secured to the drum 92, as illustrated in Fig. 6. The stop members 107 are so arranged that the drum 92 may be stopped with any one of the printing members 90 in printing position, dependent upon the stop member used.

The stop members 107 are controlled by the tabs which are removably mounted on the printing devices, as heretofore described. As shown in Fig. 19, the portion 77 of the tab, which portions extend outwardly from the printing device, may be divided into six equal areas, any one or more of which areas may be depressed from the plane of the remaining areas. The boundaries of these areas are indicated by the dotted lines in Fig. 17.

While I have shown a tab having six areas, obviously I may use six different tabs or any number of tabs which would provide the required number of areas. In the present instance I have selected one tab having six areas, as such arrangement provides sixty-three different combinations of such areas. For instance, in one tab the area *a* may be depressed, while in another tab areas *a* and *b* may be depressed, or the areas *a*, *b*, *c*, *d*, *e* and *f* may all be depressed. As there are sixty-three different combinations of such areas possible, it is readily seen that I may use a different combination of areas to represent each supplemental printing member, and to indicate the number of shares owned by the stockholder whose name may be carried by the printing device to which the tab is attached.

The stops 107, of which there are also sixty three, are therefore arranged so as to become active to stop the drum 92, which carries the supplemental printing member, whenever a definite type of tab is present on the printing device which lies in printing position beneath the platen 14. The stops as shown comprise levers 107 which are mounted in slots 110 and 111 formed in the periphery of a barrel 112, which is attached to the drum shaft 94 as shown in Fig. 6, the drum shaft, being supported against rotation in the frame 10, as heretofore mentioned, restrains the stop levers against rotation. The stops 107 are each pivotally mounted on the barrel, as at 109, so that their right-hand ends 114 (Fig. 6) may swing radially outwardly, by suitable springs 115, into the path of the abutment 108 carried by the drum 92.

The movement of the stop arms under the influence of the springs 115 is normally restrained by a series of permutation members. As shown, each permutation member comprises a permutation ring and a controlling member therefor, the rings being indicated at 120 to 125, inclusive. These permutation rings encircle the stop arms 107 adjacent the right-hand ends thereof and are separated from each other by suitable spacers 126. Each permutation ring has, as shown in Figs. 9 to 14, inclusive, a series of radially extending notches 127 formed in its internal periphery. The arrangement or separation of the notches, in one ring, varies from the arrangement or separation of the notches in the other rings. The arrangement is such that the movement of any ring, or each ring in any combination of rings, a definite distance will align one notch in each ring with a notch in each other ring, and thereby permit a spring 115 to swing its respective stop arm outwardly into the path of the drum abutment 108. Each combination of positions of the permutation rings, due to the movement of any ring or rings, aligns the notches 127 to permit a different stop lever 107 to move into the path of the drum abutment 108, and so positions the other notches that all other stop levers are retained in their innermost or inactive positions by the faces of the teeth 118 between the notches.

The movement of the rings 120 to 125 is limited by a pin 129 which engages the walls of a slotted opening formed in the discs. This pin is mounted in a collar 130 which encircles the stop levers 107 and is secured to an annular boss 131 formed on the barrel. As shown, the collar 130 is shrunk in place on the drum. Each spacer ring 126 is provided with an opening through which the pin 129 passes, the size of such opening is such as to prevent relative movement between the spacers and the barrel.

As shown in the drawings, the slotted opening 128 is of such size as to permit the permutation ring to move substantially half the thickness of the arms 107. Each permutation ring is normally held with the pin 129 in contact with the right-hand end of the slot 128, as shown in Fig. 5, by a suitable tension spring 132, which is interposed between the permutation ring and a bar 133 carried by the collar 130.

When the permutation rings are in their normal position, the teeth formed in the slots of the rings effectively restrain each of the stop levers 107 against swinging radially outwardly. However, when the permutation rings are active, certain of the notches in the ring are aligned, thereby permitting a selected one of the stop levers 107 to swing radially outward, depending upon which one or ones of the permutation rings have been moved. The notches are so arranged that one definite set of notches are aligned for each movement or combination of movements of the permutation rings, and therefore any one of the sixty-three stop levers may be selected, dependent upon the movement of the proper permutation ring or rings.

The permutation rings are partially rotated by means of a series of small electric motors 150, there being one motor for each ring. As shown, each motor 150 has connected to its armature shaft 151 a flexible cord 152, which passes around a pulley 153, carried by an upstanding frame member 154, and a second pulley 155, carried by arms 156 which are integral with the spacer 126 and has its end connected to the respective permutation ring as at 157. Hence, consequent upon the operation of any one of the motors 150, its respective permutation ring will be moved in a counter-clockwise direction, a distance equivalent to half the thickness of a stop lever.

The motors 150 are of such a type that continued application of current thereto will not injure the motor, even though the movement of the armature shaft 151 thereof has been stopped, due to its corresponding permutation disk having reached the limit of its movement.

The motors 150 are controlled by suitable switch members 145, which are mounted in the guideway 13 beneath the printing device which is in printing position. As shown in Figs. 3, 15 and 16, I have provided a series of switch operating members 140, pivoted as at 141, in a suitable block 142, carried by the guideway 13. The forward end 143 of the operating members engage respective tines 144 of a comb spring or switch member 145.

When a printing device passes into printing position, and a depressed portion 69 of a tab T engages an abutment 146 of the switch operating lever 140, it swings the lever and the coacting spring tine of the switch member 145 downwardly, bringing such tine into contact with a contact member 147. As shown in the electrical diagram of Fig. 21, electrical energy is supplied to a timing switch 148 and thence through a conductor 149 to the switch, through such contacts 147, as are closed, due to the action of the tab, to their respective motors 151 through conduits 139, thereby energizing whichever motor or motors corresponds to the depressed area of the tab and setting the corresponding permutation ring or rings, permitting a selected one of the stop levers 107 to swing outwardly into position to contact with the abutment 108 of the supplemental printing drum 92, thereby stopping the drum with the printing member uppermost, which corresponds to the number of shares indicated or represented by the tab on the printing device in its uppermost position.

The timing switch 148 is periodically operated by a cam 160 secured to the cam shaft 97, heretofore mentioned. As shown in Fig. 5, the cam 160 coacts with a roller 161 carried by a lever 162, secured to a vertically extending rock shaft 163, which is rotatably mounted in the frame bracket 88 in any well-known manner. Adjacent its lower end, the rock shaft 163 is provided with a pin 164, arranged to be swung into engagement with the timing switch 148 closing the switch and making a circuit to the comb switch member 145. The timing switch is so arranged that it will energize the motors 150 to set the permutation rings at a predetermined time interval, so as to prevent damage to the permutation ring and to cause the rotation of the printing drum to bring a different printing member into printing position at a period when the platen is idle.

After an impression has been made from a selected printing member and before the motors 150 act to reset the permutation rings, the stop lever which was rendered active to position such printing member is restored. As shown in Figs. 4, 5 and 6, the shaft 163, which actuates the timing switch 148, is provided with an arm 165 arranged to engage a plunger 166, which is mounted in an axial recess within the shaft 94. A pin 167 carried by the plunger 166, passes through a slotted opening 168 in the shaft 94 and engages a cam disk or collar 169.

It results, from the mechanism described, that as the plunger 166 is moved inwardly, that is, toward the right, Figs. 4 and 5, it moves the collar 169 in the same direction, causing the cam surface 170 thereof to engage the left-hand ends 171 of the stop levers 107, swinging them about their pivots against the action of the springs 115, thereby throwing all of the arms into contact with the supporting barrel and out of the notches in the permutation rings, whereupon the rings are free to move under the impulse, either of the motors 150 or springs 132. The cam 160, which actuates the shaft 163, is so arranged that immediately after a period of time has elapsed sufficient for the motors 150 and the springs 132 to set the permutation rings to a new position, the collar of the arm 165 is swung out of contact with the plunger 166, permitting a compression spring 173 to return the plunger and collar to outermost or left-hand position, (Figs. 4 and 5), thereby permitting the stop lever 107 which lies opposite the newly aligned notches in the permutation rings to be rocked by its spring 115 into such notches and engage the abutment 108 of the printing drum 92.

A shock absorber is provided to prevent damage to either the printing drum or the stop lever units when the former is stopped. As indicated in the drawings, especially Figs. 5 and 6, the shaft 94, which supports such units, is rotatably journalled in the frame 10. Secured to the left-hand end of the shaft 94 (Fig. 5) is a lever 180 carrying an adjusting screw 181 arranged to be maintained in contact with a pin 182 mounted in a frame bracket 183 by a comparatively stiff spring 184. This permits the shaft to give under the impact of the abutment 108 on a stop lever 107 and be quickly returned by the spring 184. It also permits the printing drum to be aligned relative to the opening in the table 11 through which the impression is made.

While I have described my permutation members as comprising rings and individual control members or motors therefor, I nevertheless use the term "permutation members" to designate any type of members so arranged that a small number of index positions may control the same number of members, which in turn will cooperate with each other to control a greater number of stops, so that each one of the stops will be enabled to be selectively operated to print a different line.

Suitable inking mechanisms may be provided to coact both with the printing devices D and with the printing members 90. I have indicated in Fig. 3 an inked ribbon 200, which may be interposed between the printing device and the paper beneath the platen 14 in the usual manner. I have likewise shown, in Fig. 5, a fabric or felt roller 205, arranged in rolling contact with the printing members carried by the drum 92, to supply them with ink.

From the foregoing description, it is apparent that I have provided a printing mechanism to greatly facilitate the printing of addresses combined with other data, as, for instance, in dividend checks, and have arranged the various mechanism in a simple form, whereby the small number of selection areas of one or more index members carried by the printing devices, and may operate to select any one of a much larger number of supplemental printing members to cause such printing members to make an impression upon the same sheet as was impressed by the printing device carrying such index member.

I claim:

1. The combination of a plurality of printing devices, a plurality of supplemental printing members, means whereby any one of said members may be brought into printing position regardless of its relation to other printing members under the control of index tabs removably carried by the printing devices, and means whereby an impression may be made on the same article by one of the printing devices and the corresponding selected printing member.

2. A plurality of printing devices, each having a removable index tab, means to make impressions from such devices one at a time, a series of additional printing members, any one of which may be rendered active, according to the position of a series of permutation members, and mechanism actuated by the tabs for controlling the permutation members.

3. A plurality of printing devices, means to make impressions from such devices one at a time, a series of additional printing members, a series of permutation members for controlling the additional printing members, a series of electro-magnets for positioning the permutation members, and different index tabs carried by different printing devices and controlling different electro-magnets.

4. In a selective printing machine, the combination of a series of printing devices, means for feeding them to printing position, a series of additional printers, permutation mechanism for controlling the same, and a series of index tabs having variably positioned shoulders, said tabs being adapted to be mounted on the printing devices and by the action of one or more shoulders on the tab actuate the permutation mechanism.

5. In a printing machine, the combination of a bed, a series of levers carried thereby side by side, means for feeding a printing device over the levers, removable index tabs adapted to be mounted on the printing devices and selectively operate the levers according to the character of the tab, and a series of additional printing devices controlled by said levers.

6. In a selective printing machine, the combination of a series of printing devices, a series of tabs adapted to be mounted thereon, different tabs having different portions offset from the plane of the tab, a set of electric contact levers adapted to be differently operated by different tabs, electric circuits controlled by said levers, electro-magnets actuated by said circuits, permutation members controlled by the electro-magnets, and additional printing devices controlled by the permutation members.

7. In a selective printing machine, the combination with a set of printing members of a set of permutation members, each having notches, a set of individual actuating motors one for each permutation member and being adapted to position the members relative to each other, and stop bars controlling the printing members and adapted to be moved through aligned notches of the permutation members into active position.

8. In a selective printing machine, the combination of a series of internally notched rings, means for simultaneously positioning said rings by rotative movement so that the notches may selectively align, stop bars adapted to occupy aligned notches, a printing drum carrying a set of printing members on its periphery, means for turning said drum, and means for stopping it by one of the stop bars moved through aligned notches of said rings.

9. In a printing mechanism, a plurality of printing devices, means to make impressions from the printing devices one at a time, a plurality of printing members, a series of selector members radially disposed in cylindrical formation, each of said members being supported for radial movement, means whereby the radial movement of each of said selector members operates to position a predetermined printing member in printing position, and means carried by said printing devices to control the operation of said selector members.

10. A printing mechanism including a plurality of printing devices, means to make individual impressions from said printing devices one at a time, a rotary drum, a plurality of printing members on said drum, means to frictionally drive said drum, an abutment on said drum, a plurality of stop fingers adapted to selectively engage said abutment to stop the drum with any desired printing member carried thereby in a predetermined printing position, depending upon which stop finger engages the abutment, a plurality of notched rings encircling said fingers and movably mounted to align one notch with a corresponding notch to each other ring, means to independently move said rings in a limited distance to align one notch in each ring for reception of a stop finger, the notches being so arranged that the movement of predetermined rings align predetermined notches, and means to force a stop finger into said aligned notches, whereby it may engage said abutment.

11. In a selective printing machine, the combination of a series of internally notched rings mounted side by side, means for positioning said rings by rotating movement thereof to cause selected notches to align, means adapted to occupy such aligned notches, a printing device carrying printing lines, and means for positioning said device under the control of the means in the aligned notches.

12. In a selective printing machine, the combination of a plurality of printing devices, each having an index tab arranged and adapted to be changed without changing the structure of the printing device, and a series of additional printing members, any one of which may be selected and rendered active according to the character of the index tab.

13. The combination of a plurality of printing devices, a plurality of supplemental printing members, means whereby any one of said members may be brought into printing position regardless of its relation to other printing members, and under the control of a tab carried by the printing device and subject to change without changing the structure of the printing device, and means enabling printing on the same article by a printing device and the corresponding selected printing member.

14. In a selective printing machine, the combination of a plurality of printing devices each having a changeable index tab and a series of additional record-making members, any one of which may be selectively rendered active according to the character of the index tab.

15. In a printing mechanism, a plurality of printing devices, each having an index tab arranged and adapted to be changed without changing the structure of the printing device, means to feed said devices one at a time to printing position, a rotatable drum carrying a plurality of removable record making members, means to rotate said drum under the control of the tabs on the printing members and means to make a record on the same article by one of the printing devices and the corresponding record making member.

16. In a printing mechanism, a plurality of printing devices, each having a removable index tab, means to feed said devices one at a time to printing position, a rotatable drum, a plurality of lines of printing characters carried by said drum, means to rotate said drum, means under control of the tabs for stopping the drum with any selected line of characters in printing position, and means to print from such line while the drum is at rest.

17. A plurality of printing devices, each having a tab changeable without mutilating the printing device, means to make impressions from such devices one at a time, a series of additional record making members, any one of which may be rendered active, according to the position of a series of permutation members, said permutation members being controlled by the tabs.

18. A plurality of printing devices, means to make impressions from such devices one at a time, a series of additional record making members, any one of which may be rendered active, according to the position of a series of permutation members, a series of individual actuators, each for positioning the corresponding permutation member, and removable index tabs carried by the printing devices and controlling the actuators according to the character of the tab.

19. In a printing mechanism, a plurality of printing devices, means to feed said devices one at a time to printing position, a set of additional record making members, electromagnetic means for selecting a member of the set, and removable index tabs on the printing devices adapted to variably control the circuits to the electromagnetic means.

20. The combination with a set of address plates, means to make impressions from such plates successively, a series of record making members, a series of permutation members, a series of individual actuators, one for each permutation member, for positioning the permutation member, means coacting with a plurality of permutation members for controlling the record making members, and changeable indices associated with the address plates and controlling the different actuators.

21. In a selective printing machine, the combination of a set of record making members, a set of permutation members each having notches, a set of individual actuators, one for each permutation member, stop bars controlling the record making members and adapted to be moved through aligned notches of the permutation members, a second set of record making members, each carrying means to control one or more of said actuators, and means controlled by an active stop bar for selecting the desired record of the first record making member and means to cause a record to be made from one of the second-named set on a work-piece and to cause the record of the other set to be made on the same work-piece.

22. In a selective printing machine, the combination of a series of notched rings mounted side by side, means for positioning said rings by rotative movement thereof to cause selected notches to align, means adapted to occupy such aligned notches, a set of record making members and a second set of individual record making members, each of said last-named members carrying means for selecting one member of the first-named set of record making members under the control of the means which occupies the aligned notches.

23. A selective printing machine, the combination of a movable carriage, a plurality of record making members mounted on said carriage and adapted and arranged to be selectively moved to a printing position, means to move said carriage, means to stop the movement of said carriage with a predetermined record making member in printing position, said last-named means including a plurality of control members, electric motors operatively connected with respective control members, and means to selectively operate said motors.

24. In a selective printing machine, the combination of a plurality of printing devices, some of which carry indices, means to make impressions from such devices one at a time, a plurality of supplemental record making members adapted and arranged to be selectively moved to a record making position, a plurality of movable controllers adapted to coact to bring a predetermined supplemental member to rest in record making position, a plurality of electric motors operably connected with respective controllers, electric circuits for said motors and means to energize said circuits, said last-named means being controlled by the indices on the printing devices.

25. In a printing machine, combination of a plurality of printing and control devices each including printing means and control means and in which the control means are in the form of index tabs removably carried by said printing and control devices, a plurality of supplemental printing members, means under the control of said index tabs whereby any one of said supplemental printing members may be brought into printing position regardless of its relation to the others of said supplemental printing members, and means whereby an impression may be made on the same article by one of said printing and control devices and the corresponding selected one of said supplemental printing members.

26. In a printing machine, a plurality of printing devices, each having an index tab arranged and adapted to be changed without changing the structure of the printing device, means to feed said devices one at a time to printing position, a rotatable drum carrying a plurality of removable record making members, means to rotate said drum under the control of the tabs on the printing members, impression-producing means at said printing position for making impressions from said printing devices, other means cooperating with said record making members to produce records therefrom, and means for operating said impression-producing means and said other record-producing means.

27. In a printing machine, a plurality of printing and control devices each including printing means and control means and in which the control means are in the form of index tabs removably carried by the printing and control devices, means for making impressions from said devices one at a time, permutation means, means for operating said permutation means, a series of printing members under the control of said permutation means, and means actuated by said index tabs for controlling the operation of said permutation means.

28. In a printing machine through which a series of printing and control devices each including printing means and control means is fed, means for making impressions from the printing means of said printing and control device, permutation means, a series of record-making members under the control of said permutation means, and means under the control of the control means on said printing and control devices for actuating said permutation means to selectively render said record-making members operative.

29. In a printing machine as defined in claim 28, means cooperating with said record-making members, when the latter are operative, for making records therefrom, and means for operating the impression-making means and the record-making means.

30. In a printing machine as defined in claim 28, means cooperating with said record-making members, when the latter are operative, for making records therefrom, means for operating the impression-making means and the record-making means, and means for feeding a sheet into cooperative relationship with said impression-making means and said record-making means.

31. In a printing machine through which a series of printing and control devices each including printing means and control means is fed, means for making impressions from the printing means on said printing and control devices, permutation means, a series of record-making members under the control of said permutation means, and electromagnetic means under the control of the control means on said printing and control devices for actuating said permutation means to selectively render said record-making members operative.

32. In a printing machine through which a plurality of printing devices each carrying an index tab are sequentially fed, means cooperating with said printing devices to make impressions therefrom, permutation members, printing members under the control of said permutation members, and means including electromagnets under the control of said index tabs for positioning said permutation members.

33. In a printing machine, the combination of a series of printing devices each carrying an index tab having a shoulder formed thereon, means for feeding said printing devices into printing position in the machine, permutation means under the control of the shoulders on said index tabs, and additional printing members under the control of said permutation means.

34. In a printing machine, the combination of, a bed, sensing means carried by said bed, means for feeding printing devices into cooperative relationship with said sensing means, index tabs carried by said printing devices and having identifying characteristics and operable to operate said sensing means in accordance with the identifying characteristic thereof, a carrier on said bed and having a plurality of record-producing members thereon each related to a particular identifying characteristic, and means under the control of said sensing means and operable on said carrier to selectively dispose said record-producing members in record-producing position in accordance with the particular operation of said sensing means.

35. In a printing machine, the combination of, a bed, sensing means carried by said bed, means for feeding printing devices into cooperative relationship with said sensing means, control means carried by each of said printing devices and having identifying characteristics and operable to operate said sensing means in accordance with the identifying characteristics thereof, a carrier on said bed and having a plurality of record-producing members thereon each related to a particular identifying characteristic, and means under the control of said sensing means and operable on said carrier to selectively dispose said record-producing members in record-producing position in accordance with the particular operation of said sensing means.

36. In a printing machine, means for feeding a sequence of printing and control devices each bearing printing means and control means through the machine to have sensing and printing operations performed thereon, means cooperating with the printing means on each of said printing and control devices for producing a record upon a sheet, means for sensing the control means on said printing and control devices when said devices are in printing position, a carrier, a series of printing members carried by said carrier, and means under the control of said sensing means and cooperating with said carrier to dispose a selected one of said printing members in position to print an additional record therefrom upon said sheet.

37. In a printing machine, means for feeding a sequence of printing and control devices each bearing printing means and control means through the machine to have sensing and printing operations performed thereon, means cooperating with the printing means on each of said printing and control devices for producing a record upon a sheet in the machine, means for sensing the control means on said printing and control devices when said devices are in printing position, and means under the control of said sensing means for producing an additional record upon said sheet.

38. In a printing machine, printing devices adapted to be fed through the machine and each carrying an index tab having a portion offset from the plane of the tab, a plurality of electrical contact members under the control of said index tabs, electrical circuits each including an electromagnet under the control of said contact members, permutation means under the control of said electromagnets, and additional printing members under the control of said permutation means.

39. In a printing machine, address plates adapted to be fed sequentially through the machine and each carrying an index element, means successively cooperating with said address plates to make impressions therefrom, permutation members, record-making members, means under the control of said index elements for actuating said permutation members, and means cooperating with said permutation members for controlling the operation of said record-making members.

40. In a printing machine into which a unitary printing and control device bearing a record is inserted and which device includes type characters constituting part of the record and control means constituting another part of the record, printing means constructed and arranged to make an impression directly from the permanently reproducible type characters on said device, other printing means settable under control of the control means on said device to make an impression, means for effecting movement of sheets to both printing means, and means controlling operation of both of said printing means and the means effecting sheet movement to cause the impression made from the type characters on said device and the impression made under control of the control means on said device to be made on the same sheet.

41. In a printing machine, means for feeding through the machine a series of printing and control devices, each of which devices includes type characters constituting part of a record and control means constituting another part of the record, printing means constructed and arranged to make an impression directly from the type characters on each of said devices, other printing means settable under control of the control means to make another impression, means for effecting movement of separate sheets to both of said printing means, and means for operating both of said printing means and the means effecting sheet movement to cause the impression made from the type characters on one of said devices and the impression made under control of the control means on said one of said devices to be made on the same sheet.

42. In a printing machine having at least two printing means mounted therein at spaced positions, means for feeding a sheet first into one of said printing means and then into the other of said printing means, one of said printing means comprising settable printing members, the other of said printing means being adapted to have a unitary printing and control device fed thereto, said printing and control device including type characters from which an impression is made directly by the printing means into which the device is fed and control means under control of which said settable printing members in the other printing means are set up, and means for setting up said settable printing members under the direct control of the control means on said device, said printing means and the sheet feeding means being timed to cause the impressions made by the respective printing means to be made on the same sheet.

43. In a printing machine having at least two printing means mounted therein at spaced positions, means for feeding a sheet first into one of said printing means and then into the other of said printing means, one of said printing means comprising settable printing members, the other of said printing means being adapted to have a unitary printing and control device fed thereto, said printing and control device including type characters from which an impression is made directly by the printing means into which the device is fed and control means under control of which said settable printing members in the other printing means are set up, and means cooperating with said control means and operable to set up said settable printing members under the sole control of the control means on said printing and control device, said printing means, the setting up means and the sheet feeding means being timed to cause the impressions made by the respective printing means to be made on the same sheet.

44. In a printing machine having at least two printing means mounted therein at spaced positions, means for feeding a sheet first into one of said printing means and then into the other of the said printing means, one of said printing means comprising settable printing members, means for feeding unitary printing and control devices into cooperative relation with the other of said printing means, each of said printing and control devices including type characters from which an impression may be made directly by the printing means into which the devices are fed and control means under control of which the settable printing members in the other printing means are set up, and means cooperating with said control means and operable to set up said settable printing members, said printing means, printing and control device feeding means, the setting up means and the sheet feeding means being timed to cause the impressions made by the respective printing means to be made on the same sheet.

45. In a printing machine, settable printing means, a printing means into which a unitary printing and control device is adapted to be fed, the printing and control device including type characters from which an impression may be made directly by the printing means into which it is fed and control means under control of which the settable printing means is set up, means cooperating with said control means and operable under the direct control thereof to set up said settable printing means, and means to feed a sheet first into one of said printing means and then into the other of said printing means, said printing means, the setting up means and the sheet feeding means being timed to cause the impressions made by the respective printing means to be made on the same sheet.

46. In a printing machine, settable printing means, a second printing means, means for feeding unitary printing and control devices into cooperative relation with the second printing means, each of said printing and control devices including type characters from which an impression may be made directly by the printing means into which the devices are fed and control means under control of which the settable printing members in the other printing means are set up, means cooperating with said control means and operable under the direct control thereof to set up said settable printing members, said printing means, the printing and control device feeding means, the setting up means and the sheet feeding means being timed to cause the impressions made by the respective printing means to be made on the same sheet.

47. In a printing machine having at least two printing means therein, one of said printing means comprising settable printing members, the other printing means being operable to make an impression directly from a unitary printing and control device associated therewith, means for setting up the settable printing members from and under the direct control of the control means on the printing and control device, and means for operating the means for setting up the settable printing members and the printing means in timed relation with each other.

48. In a printing machine having at least two printing means therein, one of said printing means being operable to make an impression directly from permanently reproducible type characters on a unitary printing and control device associated therewith, the other of said printing means comprising settable printing members, means for setting up said settable printing members under the sole control of control means on a printing and control device, means for feeding printing and control devices into association with the said one of the said printing means adapted to make impressions from the type characters thereon and into association with the means for setting up said settable printing members, and means for operating said printing and control device feeding means, said means for setting up said settable printing members and said printing means in timed relation with each other.

49. In a printing machine having at least two printing means therein, one of said printing means being operable to make an impression directly from permanently reproducible type characters on a unitary printing and control device associated therewith, the other of said printing means comprising settable printing members, means for setting up said settable printing members under the sole control of control means on a printing and control device, means for feeding printing and control devices into association with the said one of the said printing means adapted to make impressions from the type characters thereon and into association with the means for setting up said settable printing members, means for positioning sheets in association with said printing means to receive impressions therefrom upon operation thereof, and means for operating said sheet-positioning means, said means for operating said printing and control device feeding means, said means for setting up said settable printing members and said printing means in timed relation with each other to insure that the impression made on a particular sheet from the type characters on a particular one of said devices is made on the same sheet as that on which an impression is made from the settable printing members when said settable printing members are set up under control of the control means on the said particular one of said devices.

50. In a printing machine having at least two printing means herein, one of said printing means being operable to make an impression directly from permanently reproducible type characters on a unitary printing and control device associated therewith, the other of said printing means comprising settable printing members, means for setting up said settable printing members under the sole control of control means on a printing and control device, means for feeding a printing and control device into association with the said one of said printing means adapted to make impressions from the type characters thereon and into association with the means for setting up said settable printing members, means for positioning a sheet in association with said printing means to receive an impression therefrom upon operation thereof, and means for operating said sheet-positioning means, said means for operating said printing and control device feeding means, said means for setting up said settable printing members and said printing means in timed relation with each other to insure that the impression made from the type characters on said printing and control device is also made on the said sheet on which an impression is made from the settable printing members when said settable printing members are set up under control of the control means on the said printing and control device.

51. In a printing machine, means for feeding a sequence of unitary printing and control devices each bearing printing means and variable data-representing control means through the machine to have sensing and printing operations performed thereon, means for sensing the control means on said devices, means under control of the control means on said devices, upon sensing thereof by said sensing means, for printing variable data upon a sheet in the machine, and means cooperating with the printing means on said devices for printing additional data directly upon said sheet.

WALTER T. GOLLWITZER.